June 9, 1953 G. W. WALLIN 2,641,647

TUNING DEVICE

Filed June 14, 1949

INVENTOR.
Gus W. Wallin,
BY
Norman L. Mueller
Atty.

Patented June 9, 1953 2,641,647

UNITED STATES PATENT OFFICE 2,641,647

TUNING DEVICE

Gus W. Wallin, Chicago, Ill., assignor to Motorola, Inc., Chicago, Ill., a corporation of Illinois Application June 14, 1949, Serial No. 99,004

13 Claims. (Cl. 178—44)

This invention relates to tuning devices of the character employed in television and frequency modulation receivers, and particularly to coaxial tuners such as are disclosed in the copending applications of Gus W. Wallin, Serial No. 625,145, filed October 29, 1945, now Patent No. 2,496,321, and Serial No. 768,382, filed August 15, 1947, now Patent No. 2,496,322.

In a coaxial tuner of the type just referred to, an inner wire conductor is supported in concentric relation with an outer cylindrical conductor or pipe. A suitable core is axially movable in the space between the two conductors for varying the inductance of the tuner. A small, adjustable capacitor or trimmer is associated with the tuner for adjusting the capacitance thereof. The resonance frequency of the tuner is varied by changing the inductance or capacitance, or both.

It is very desirable that the trimmer employed with the tuner have stable temperature characteristics. The trimmers employed in many standard coaxial tuners have been observed to undergo a marked change of capacitance when subjected to a cycle of temperature variations. Not only does the capacitance vary with a change of temperature, but it is not unusual to find that the capacitance of a trimmer for a given temperature changes by as much as 40 percent when the tuner is heated to the customary operating temperature of the receiver chassis and is then cooled again. Such instability is the cause of numerous difficulties in manufacturing and servicing the receivers. Another disadvantage of coaxial tuners as constructed heretofore is the stray inductance which is introduced by the leads of the trimmer, which becomes a serious factor at very high frequencies. It is desirable that such stray inductance be eliminated altogether, preferably by locating the trimmer within the pipe of the tuner, but on the other hand, the trimmer should be readily accessible for necessary adjustments thereof. For this reason, manufacturers customarily locate the trimmer outside of the tuner pipe proper, despite the inductance introduced by the associated leads.

An object of the present invention is to provide an improved coaxial tuner which avoids the disadvantages mentioned above.

Another object is to provide an improved coaxial tuner in which the trimmer is located substantially entirely within the pipe of the tuner, is readily accessible for adjustment thereof independently of the tuner core, and has exceptionally high temperature stability.

A further object is to provide a novel coaxial tuner which gives better performance than the standard coaxial tuners and is also competitive with such tuners as to cost.

A feature of the invention is the provision of a coaxial tuner including a pipe with an axially movable core in one end thereof and a trimmer in the other end thereof, such trimmer comprising a radially expansible collet and a layer of compressible dielectric material interposed between the collet and the pipe.

As another feature of this tuner, the adjusting screw for producing expansion and contraction of the collet is accessible at the end of the pipe in which the collet is mounted.

As still another feature, the collet supports one end of the inner conductor of the coaxial tuner, maintaining this inner conductor properly centered with respect to the outer conductor or pipe.

The foregoing and other objects, features and advantages of the invention will be understood from the following detailed description thereof taken in connection with the accompanying drawings wherein.

Figures 1, 2, 3, 4:
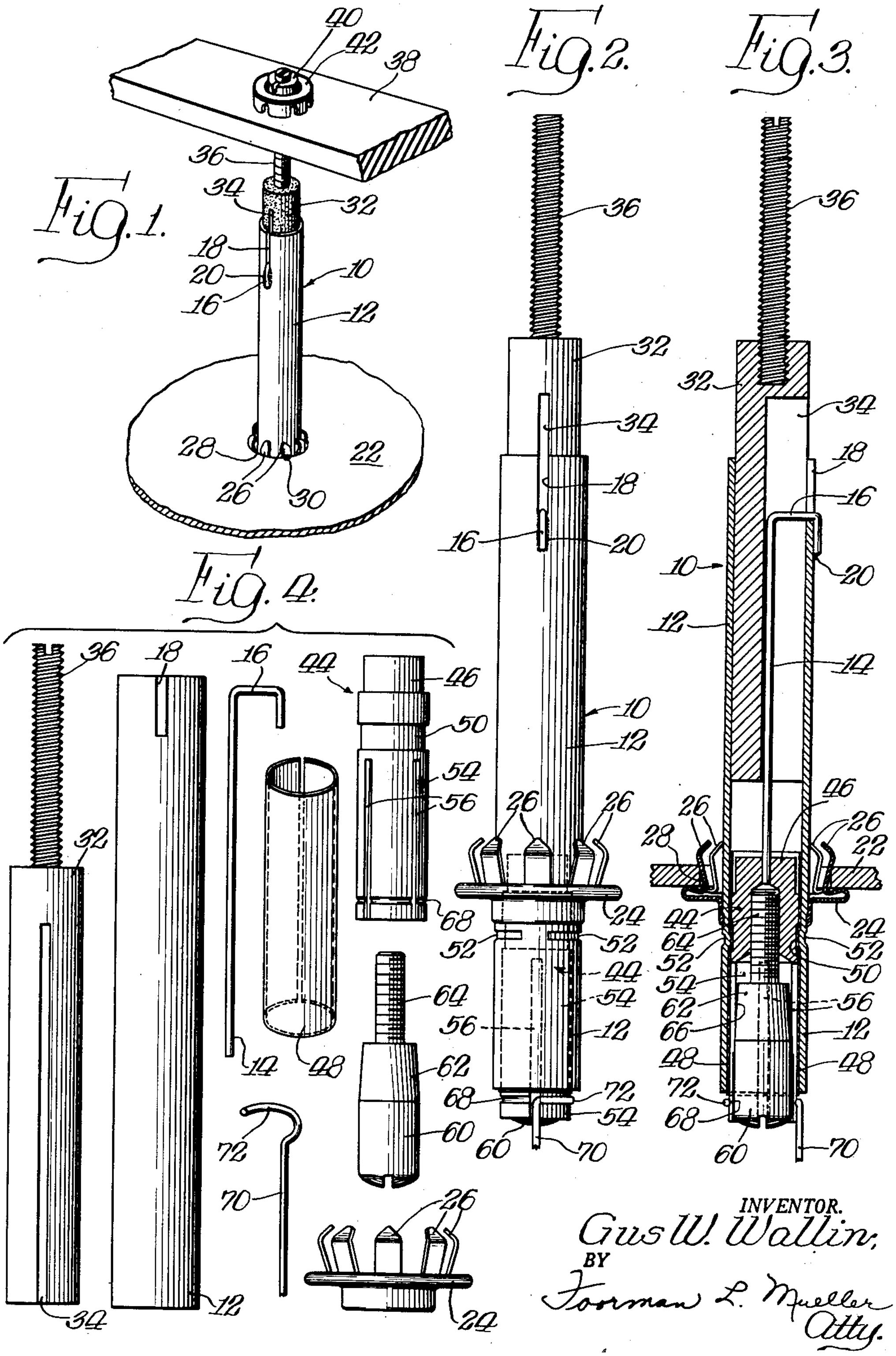
Fig. 1 is a fragmentary perspective view of a coaxial tuner mounted on a receiver chassis, such tuner embodying the principles of the invention.
Fig. 2 is an enlarged elevational view of the tuner.
Fig. 3 is a vertical sectional view of the tuner.
Fig. 4 is a disassembled view of the tuner.

In practicing the invention, the tuner is constructed as a coaxial transmission line having independently variable inductance and capacitance portions. This transmission line comprises a short length of pipe serving as the outer conductor thereof, and an inner conductor consisting of a wire which, for the greatest part of its extent, is disposed centrally of the pipe. One end of the inner conductor has a radially extending portion which is secured to the outer conductor. In this end of the pipe there is disposed also an axially movable core which is longitudinally slotted to clear the inner conductor of the tuner. As the core is moved axially in the space between the two conductors, it varies the inductance of the tuner. At the other end of the pipe, there is located a concentric capacitor or trimmer, of which the pipe constitutes the outer plate. The inner plate comprises a collet disposed substantially entirely within the pipe and having a fixed portion which is secured to the inner conductor of the transmission line, serving to support this conductor and maintain it accurately centered within the pipe. The collet also has a radially expansible, resilient sleeve portion. An annular layer of dielectric material is interposed between the collet and the pipe to insulate them from each other. An adjusting screw member is threaded into the fixed part of the collet and has a tapered part which is wedged in the sleeve portion of the collet. The dielectric material is compressible, and as the adjusting screw is moved in and out, the pressure upon the dielectric is varied to change the capacitance of the trimmer. The tuner is supported on the receiver chassis in an upright position by a snap fastener device mounted on the outside of the pipe.

Referring now to the drawings, the tuner 10 includes a coaxial transmission line comprising an outer cylindrical conductor or pipe 12 and an inner conductor or wire 14, the greater portion of which is disposed on the axis of the pipe 12. The upper end of the wire 14 has a lateral or radial extension 16 which extends through a longitudinal slot 18 at one end of the pipe 12 and is soldered to the exterior of the pipe 12 as indicated at 20. The pipe 12 is supported in an upright position on the chassis 22 (Fig. 1) of the receiver by a snap fastener button 24 (Figs. 2, 3 and 4) which is force-fitted onto the pipe 12. The prongs 26 of the button 24 are inserted into a suitable hole 28 in the chassis 22, and when they are snapped through, these prongs 26 hold the tuner 10 in the position shown. The button 24 also serves to connect the pipe 12 electrically to the chassis 22. To insure a good electrical connection, the pipe 12 may be knurled at the place where the button 24 is fitted onto the pipe, and preferably at least one of the prongs 26 has a soldered connection with the chassis 22, as indicated at 30 (Fig. 1).

In the upper end of the pipe 12 there is disposed a core 32 consisting of a suitable material such as powdered iron or aluminum molded into a cylindrical form. The core 32 has an axially extending slot 34 therein to afford clearance for the radial portion 16 of the inner conductor 14 as the core 32 moves axially through the space between the conductors 12 and 14. As the core 32 moves, it varies the effective permeability of the medium between the coaxial conductors, thereby varying the inductance of the tuner 10. An axially extending screw 36 is threaded into the upper end of the core 32, and this screw 36 customarily is employed to connect the core 32 with a vertically movable carriage 38, a portion of which is illustrated in Fig. 1. The screw 36 is secured to the carriage 38 by a nut 40 and a clip 42 in a well known fashion. Any other suitable arrangement for connecting the core to the carriage can be employed, if desired.

Usually several tuners are mounted upon the receiver chassis 22, and the cores of these various tuners are connected to the carriage 38. Such tuners may be located, for example, in the antenna circuit, the local oscillator circuit and the radio frequency amplifier stage of the receiver. They are actuated in unison by the carriage 38 in accordance with the station selections which are to be made. Generally the carriage 38 is controlled by a push button tuning mechanism, which causes the carriage to assume any of a plurality of predetermined vertical positions as the push buttons are operated. The carriage 38 can, of course, be operated manually as well. The nut 40 and screw 36 also constitute an adjusting means for the inductance portion of each tuner as 10. The nut 40 is turned for axially adjusting the core 32 and thereby causing it to tune in a desired station when the carriage 38 is in a given position, preferably at the low frequency end of the tuning range.

The lower end of the pipe 12 extends below the chassis 22, and in this lower end of the pipe there is disposed a concentric capacitor or trimmer which constitutes the capacitance portion of the tuner 10. This trimmer has an outer plate consisting of the pipe 12. The inner plate of the trimmer is in the form of a collet 44 which is disposed almost in its entirety within the lower end of the pipe 12. The collet 44 has a fixed portion 46, which in its upper end has a small axial hole into which the lower end of the wire 14 is fitted when the tuner 10 is assembled. When the collet 44 is inserted in the tube 12, an annular sheet of dielectric material 48 is interposed between the collet 44 and the inside of the pipe 12 to insulate these parts from each other. The fixed portion 46 of the collet 44 has an annular groove 50 therein, and the pipe 12 is indented as shown at 52 opposite this groove 50 to secure the collet 44 therein.

The collet 44 has a radially expansible, resilient, sleeve portion 54 which extends downwardly from the lower end of the fixed portion 46 of this collet. This sleeve portion 54 has several axially extending slots 56 therein, as shown best in Fig. 4. By slotting the sleeve 54 in this manner, the sleeve is made capable of radial expansion and contraction. The collet 44 is made of a suitable non-magnetic metal, such as brass, having the requisite resiliency.

As mentioned above, the collet 44 constitutes the inner plate of a trimmer capacitor. The pipe 12 is the outer plate of this capacitor and the insulating sheet 48 is the dielectric medium between these plates. Actually the dielectric also includes a certain amount of air. However, for convenience, the sheet 48 will be considered as the dielectric of the capacitor, except where it is necessary to interpret this dielectric as including air also.

For expanding the sleeve 54 radially, there is provided a screw 60 having a partially tapered body portion 62 and a threaded shank 64. The inside wall of the sleeve 54 likewise is tapered for a short distance, as indicated at 56 (Fig. 3). The fixed portion 46 of the collet 44 has an axially extending tapped hole therein to receive the threaded shank 64 of the screw 60. As the screw 60 is threaded into the fixed portion 46, it exerts a radial wedging action upon the sleeve portion 54, thereby compressing the dielectric between the sleeve 54 and the pipe 12. This alters the capacitance of the trimmer. Conversely, if the screw 60 is withdrawn, the pressure is eased and an opposite change in the capacitance takes place. The screw 60 is made of aluminum or other suitable non-magnetic metal. In practice, the trimmer adjustment is made when the tuner is set for the high-frequency end of the tuning range.

The lowermost end of the sleeve 54 projects slightly from the lower end of the pipe 12 and has an annular groove 68 therein. A wire lead 70 has an arcuately bent end portion 72 which is received in the groove 68 and is soldered to the exterior of the sleeve 54, as shown. By this means an electrical connection to the inner plate of the trimmer is effected.

The illustrated trimmer capacitor, including the collet 44 as the inner plate thereof, is highly advantageous in that it connects directly to the conductors of the coaxial line without the use of any intervening leads. Hence, the stray inductance normally introduced by such leads is eliminated. The adjusting screw 60 is readily accessible at the lower end of the pipe 12 and may be turned by using an ordinary screw driver held along the axis of the tuner 10. The over-all length of the illustrated tuner 10 is approximately 3 inches, and the diameter is approximately ⅜''. The variable capacitor or trimmer can be adjusted by the screw 60 through a range of approximately 54 to 62 micromicrofarads. A large portion of the trimmer consists of a fixed capacitance defined by the fixed portion 46 of the collet 44 and the corresponding portion of the pipe 12, together with the intervening dielectric. The capacitor has exceptionally high temperature stability due to its unique construction. This stability may be enhanced by the choice of metals used in the various parts of the capacitor, such as the outer plate or pipe 12 (copper), the inner plate or collet 44 (brass), and the adjusting screw 60 (aluminum). The tuner 10 also provides for the usual inductance adjustment, and both the inductance and the capacitance variations are effected independently of each other.

While there has been described what is at present considered to be the preferred embodiment of the invention, it will be understood that various modifications may be made therein which are within the true spirit and scope of the invention as defined in the appended claims.

I claim:

1. A coaxial tuner comprising a cylindrical outer conductor, an inner conductor positioned substantially centrally in said outer conductor and including a portion connected to said outer conductor at one end thereof, a core movable axially into a space between a first portion of said inner conductor and a first portion of said outer conductor at said one end thereof for providing a variable inductance therebetween, a radially expansible collet disposed in the other end of said outer conductor, a layer of compressible dielectric material interposed between said collet and the inner wall of said outer conductor, and an adjusting member cooperating with said collet for expanding the same and compressing said dielectric material to provide a variable capacitance between said collet and said outer conductor, said inner conductor and said collet being electrically connected so that said variable inductance and said variable capacitance are connected in parallel.

2. A tuner comprising a coaxial transmission line including an inner conductor and a conducting pipe enclosing said inner conductor in concentric relation therewith, a variable inductance portion including said conductors and a core movable into a space between a first portion of said inner conductor and a first portion of said conducting pipe to provide a variable inductance therebetween and thereby vary the resonance frequency of the tuner, and a variable capacitance portion including an inner conducting member connected to said inner conductor and disposed substantially entirely within said pipe in concentric relation therewith, said inner member having a radially expansible sleeve portion, compressible dielectric material interposed between said inner member and said pipe, and adjusting means movable axially of said member for expanding and contracting said sleeve portion to vary the capacitance of the tuner.

3. In a tuner having a coaxial transmission line with independently variable inductance and capacitance elements therein, the combination of a center conductor for the transmission line, a pipe enclosing said center conductor, said pipe constituting the outer conductor of the transmission line and also the outer conducting member of a concentric capacitor, said capacitor having an inner conducting member disposed substantially entirely within said pipe and connected electrically to said inner conductor, said inner member including a fixed portion and an adjoining resilient sleeve portion, a screw member threaded into said fixed portion and bearing against said sleeve portion in wedging relation therewith for varying the radius of said sleeve portion as said screw member is turned, and a compressible dielectric medium interposed between said inner member and the inside of said pipe.

4. A coaxial tuner comprising a transmission line including an inner conductor and a conducting pipe enclosing said inner conductor in concentric relation therewith, a core disposed in one end of said pipe and movable into a space between a first portion of said inner conductor and a first portion of said conducting pipe to vary the inductance of the tuner, and a capacitor formed at the other end of said pipe, said capacitor having an outer conducting member including a portion of said pipe, an inner conducting member connected to said inner conductor and concentric with said pipe and radially expansible toward said pipe, a compressible dielectric medium interposed between said inner and outer members, and an adjusting screw member projecting from said inner member and from the adjoining end of said pipe, said screw member being effective when turned in a given direction to expand said inner member and vary the capacitance of the tuner.

5. In a coaxial tuner having concentric inner and outer conductors, a concentric trimmer capacitor comprising said outer conductor as an outer conducting member of the capacitor, an inner conducting member of the capacitor comprising a radially expansible collet disposed substantially entirely within said outer conductor, said collet being electrically connected to said inner conductor, an annular layer of compressible dielectric material insulating said collet from said outer conductor, and an adjusting screw threaded into said collet and having a wedge portion for radially expanding said collet to vary the capacitance of said tuner when said screw is turned.

6. In a coaxial tuner having concentric inner and outer conductors, a concentric trimmer capacitor comprising said outer conductor as an outer conducting member of the capacitor, an inner conducting member connected to the inner conductor of the tuner and consisting of a generally cylindrical member disposed within said outer conductor, said inner conducting member having a fixed portion thereof and a radially expansible portion movable toward and from said outer conductor, a compressible dielectric medium interposed between said inner and outer members, and an adjusting device accessible at one end of said outer conductor and acting upon said collet to increase and decrease the effective radius thereof for varying the capacitance of the tuner.

7. In a coaxial tuner having concentric inner and outer conductors, a concentric trimmer capacitor comprising said outer conductor as an outer conducting member of the capacitor, an inner conducting member connected to the inner conductor of the tuner and comprising a collet having a fixed portion and an adjoining sleeve portion, said sleeve portion being radially expansible toward said outer conductor, a screw member having a threaded shank received in said fixed portion and a tapered wedging portion disposed within said sleeve portion, said screw member extending axially of said outer conductor and being accessible from one end thereof, and a compressible dielectric material interposed between said collet and said outer conductor, the capacitance of the tuner being determined by the pressure which said screw member causes said sleeve to exert upon said dielectric material.

8. A trimmer capacitor including in combination, a cylindrical outer conducting capacitor plate, an inner conducting capacitor plate disposed within said outer capacitor plate and including a collet having a fixed portion and an adjoining sleeve portion accessible from an end of said outer capacitor plate, said sleeve portion being radially movable toward and from said outer plate, a compressible dielectric material separating said inner and outer plates, a screw device having a threaded shank received in said fixed portion and a wedge part disposed inside said sleeve portion, whereby said dielectric material is compressed to vary the capacitance of the trimmer as said screw device is turned, said inner and outer plates and said screw device respectively being composed of such materials as to impart high temperature stability to the trimmer.

9. A coaxial tuner comprising a concentric transmission line having inner and outer conductors, an axially movable core accessible at one end of said line and movable into a space between a first portion of said inner conductor and a first portion of said outer conductor for varying the inductance of the tuner, and a trimmer capacitor at the other end of said transmission line, said trimmer capacitor including an outer plate consisting of a portion of said outer conductor, an inner plate connected to said inner conductor and disposed within said outer conductor, said inner plate having a hollow sleeve portion radially movable toward and from said outer conductor, a compressible dielectric medium interposed between said sleeve portion and said outer conductor, and an adjusting device having a tapered portion disposed within said sleeve portion, said device being movable axially within said sleeve portion to produce radial movement of said sleeve portion and consequent variation in the capacitance of said trimmer.

10. A variable capacitor including in combination, concentric inner and outer conductors, such capacitor comprising an outer plate consisting of said outer conductor, an inner plate disposed within said outer conductor and secured to said inner conductor, said inner plate having a hollow sleeve portion capable of being expanded toward said outer conductor, a compressible dielectric medium interposed between said inner and outer plates, and a wedge member accessible from outside of said outer conductor and at least partly disposed within said sleeve portion, said wedge member being movable axially of said sleeve portion to compress said dielectric medium for varying the capacitance of said capacitor.

11. A tuner for an electronic wave receiver including in combination, an inner conductor, an outer cylindrical conductor substantially enclosing said inner conductor and in substantially concentrical relation therewith, a variable inductance portion including first parts of said conductors and a core movable into a portion of the space between the first parts of said conductors to vary the inductance of said first conductor parts, and a variable capacitance portion including second parts of said inner and outer conductors and dielectric means interposed between said second parts of said conductors, said second part of said inner conductor including a portion movable within said second part of said outer cylindrical conductor to provide a variable capacity therebetween.

12. A tuner for an electronic wave receiver including in combination, inner conductor means, a cylindrical outer conductor substantially enclosing said inner conductor means, said inner conductor means including a transverse portion electrically connected to said outer conductor at one end thereof, a core movable in the space between a first portion of said inner conductor means and a first portion of said cylindrical conductor to provide a variable inductance therebetween, said core having a slot therein to permit movement thereof past said transverse portion of said inner conductor means, and compressible dielectric means interposed between a second portion of said inner conductor means and a second portion of said outer cylindrical conductor to provide a variable capacitance therebetween, said second portion of said inner conductor means including an expansible part and means for expanding said expansible part for compressing said dielectric means to thereby vary the capacitance of said tuner.

13. A tuner for an electronic wave receiver including in combination, inner conductor means, a cylindrical outer conductor substantially enclosing said inner conductor means, a variable inductance portion including a first part of said cylindrical outer conductor and a first part of said inner conductor means, said first part of said inner conductor means including a rod like portion positioned substantially concentric with respect to said outer conductor and a connecting portion extending from said rod-like portion to said outer conductor and electrically interconnecting the same, said variable inductance portion also including a core movable in the space between said rod-like portion of said inner conductor means and said first part of said outer conductor to vary the inductance of said variable inductance portion, said core having a slot therein to permit movement of said core past said connecting portion of said inner conductor means, and a variable capacitance portion including a second part of said outer conductor, a second part of said inner conductor means, and compressible dielectric material interposed between said second parts, said second part of said inner conductor means including an expansible portion and means for expanding said expansible portion for compressing said dielectric material to thereby vary the capacitance of said variable capacitance portion.

GUS W. WALLIN.

References Cited in the file of this patent

UNITED STATES PATENTS

| Number | Name | Date |
|---|---|---|
| 1,665,616 | Trump | Apr. 10, 1928 |
| 1,939,067 | Legg | Dec. 12, 1933 |
| 2,165,575 | Polydoroff | July 11, 1939 |
| 2,206,250 | Fill | July 2, 1940 |
| 2,286,428 | Mehler | June 16, 1942 |
| 2,402,948 | Carlson | July 2, 1946 |
| 2,435,442 | Gurewitsch | Feb. 3, 1948 |
| 2,496,322 | Wallin | Feb. 7, 1950 |

FOREIGN PATENTS

| Number | Country | Date |
|---|---|---|
| 230,615 | Great Britain | Mar. 19, 1925 |
| 597,923 | Great Britain | Feb. 5, 1948 |